March 14, 1950     R. W. DOEG     2,500,669
REFRIGERATING APPARATUS

Filed Dec. 12, 1947     2 Sheets-Sheet 1

INVENTOR.
RALPH W. DOEG
BY
Ralph E. Baker
ATTORNEY

March 14, 1950 R. W. DOEG 2,500,669
REFRIGERATING APPARATUS
Filed Dec. 12, 1947 2 Sheets-Sheet 2
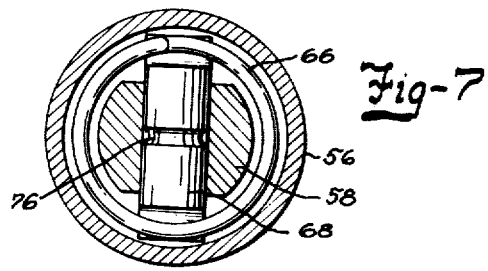
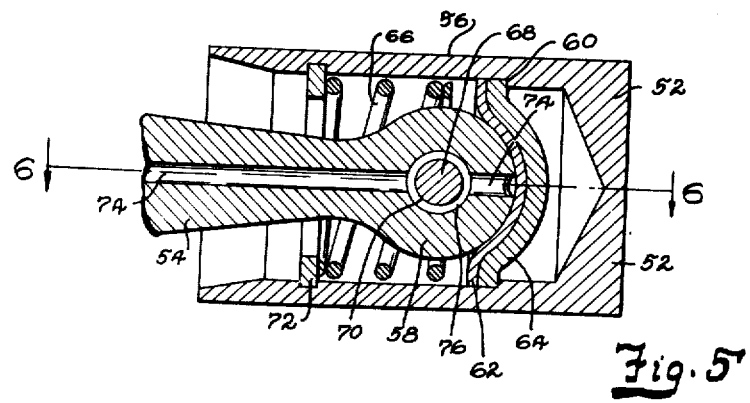
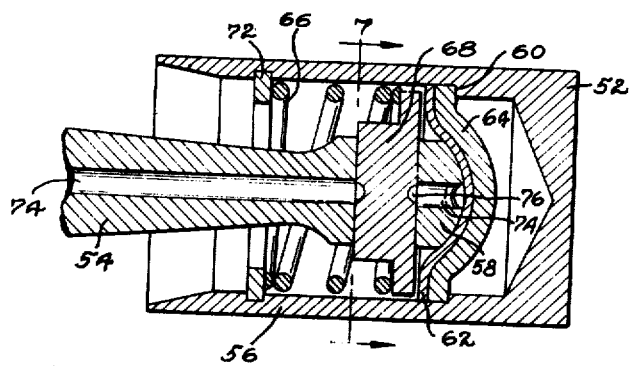
INVENTOR.
RALPH W. DOEG
BY
Ralph E. Baker
ATTORNEY Patented Mar. 14, 1950

2,500,669

UNITED STATES PATENT OFFICE 2,500,669

REFRIGERATING APPARATUS

Ralph W. Doeg, Detroit, Mich., assignor to Nash-Kelvinator Corporation, Detroit, Mich., a corporation of Maryland Application December 12, 1947, Serial No. 791,390

11 Claims. (Cl. 309—20)

This invention relates generally to refrigerant compressors and more particularly to interconnections of compressor piston and connecting rods.

One of the objects of the present invention is to provide an improved connection for operatively interconnecting a piston and a connecting rod in a manner to maintain a slack free relationship therebetween irrespective of wear of the parts.

Another object of the invention is to provide an improved piston and rod connection of the above mentioned character which also permits universal action between the rod and piston to insure free action of the parts without need of precision operation and resultant expense of making such parts.

Another object of the invention resides in the provision of a piston and rod connection which facilitates assembly thereof and generally decreases manufacturing cost of compressors.

A further object of the invention resides in the delivery of lubricant to bearings and bearing surfaces of a piston and rod connection of the character having automatic slack take-up and universal action.

Further objects and advantages of the present invention will be apparent from the following description, reference being had to the accompanying drawings, wherein a preferred form of the present invention is clearly shown.

In the drawings:

Fig. 5 is a sectional view of a modification of my piston and piston rod taken longitudinally thereof;

Fig. 6 is a sectional view of the piston and connecting rod, taken longitudinally thereof along the line 6—6 of Fig. 5; and Fig. 7 is a cross sectional view of the piston and connecting rod, taken along the line 7—7 of Fig. 6.

Figure 1:
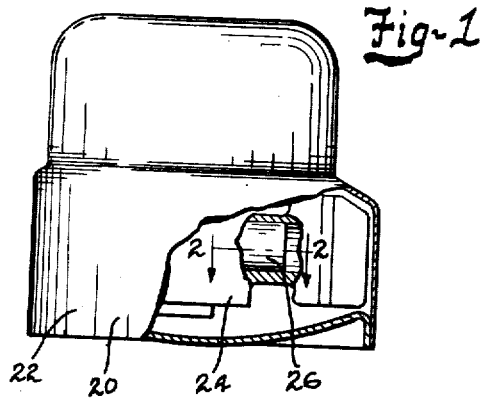
Fig. 1 is a view of a refrigerant motor-compressor unit partly broken away and in section to show a piston thereof, embodying features of my invention.
Figure 4:
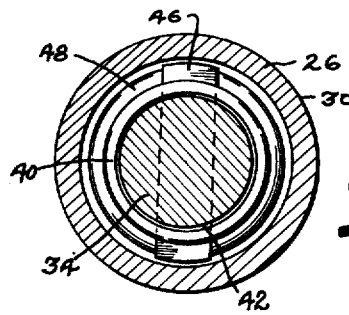
Fig. 4 is a cross sectional view of the piston and connecting rod, taken along the line 4—4 of Fig. 3.
Figure 2:
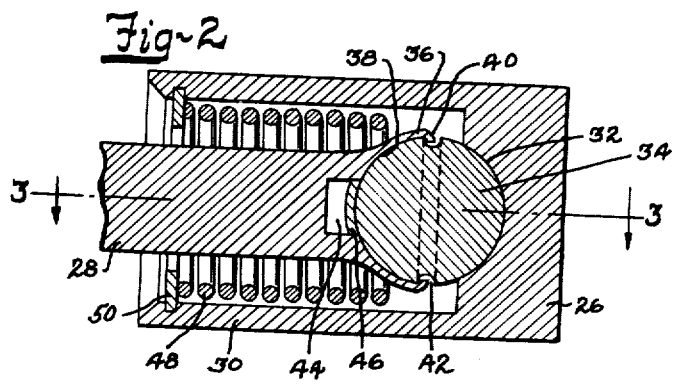
Fig. 2 is a sectional view of the piston and its connecting rod, taken longitudinally thereof along the line 2—2 of Fig. 1.
Figure 3:
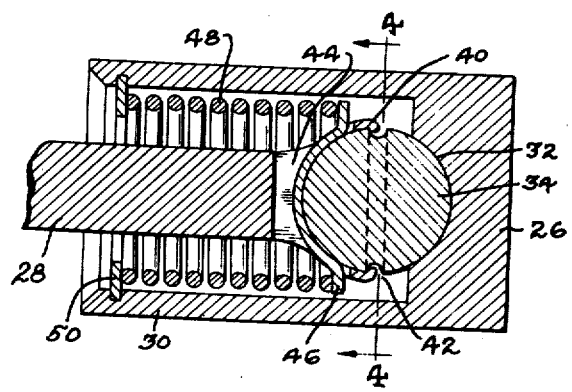
Fig. 3 is another sectional view of the piston and its connecting rod, taken longitudinally thereof along the line 3—3 of Fig. 2.

Referring to the drawings by characters of reference and first to Figs. 1 to 4 inclusive, the numeral 20 designates generally, a motor-compressor unit of the type adapted for compressing gaseous refrigerant in a household type refrigerator. The motor-compressor unit 20 includes a compressor 22 which may be enclosed in a sealed casing 24. A cylinder block 26 of the compressor 22 has a cylinder for the reception of a piston 26 which may be connected by a connecting rod 28 to a crank shaft (not shown) of the compressor 22.

The piston 26 is preferably hollow or has a skirt 30 which receives and surrounds an end portion of the connecting rod 28. In the inner end wall of the piston 26, I provide a recess or socket 32 to receive a bearing member 34 which is carried by and on the end of the connecting rod, surrounded by the piston skirt. Preferably, the socket 32 is spheroidal in shape and preferably the bearing member 34 is a ball of such spherical diameter as to fit complementary with the socket. The end of the connecting rod 28, which carries the ball bearing 34, is formed cup shape, as at 36, having a spheroidal socket 38 receiving the ball bearing member 34. An outer marginal portion of the socket cup 36 is bent inwardly, as at 40, forming a retaining ring which engages is an annular groove 42 provided in the ball bearing member 34. This connection loosely holds the bearing 34 to the end of the connecting rod in a manner such that there can be relative universal movement between the rod and ball bearing 34.

In the bearing surface of the connecting rod socket 38, I provide a recess 44 which extends laterally, the entire width of the rod, for receiving an abutment member 46 for a compression coil spring 48. The abutment member 46 is preferably formed with a spherically shaped portion intermediate its ends to conform with and engage the ball bearing member 34. Opposite end portions of the abutment member 46 project laterally of and from the rod 28 for abutment thereagainst of one end of the coil spring 48. The coil spring 48 surrounds the connecting rod 28 and has its other or outer end acting against or abutting a retainer ring 50. This retainer ring 50 may be of the so-called spring metal split type so as to be positioned and hold itself in an annular groove in the inner surface of the piston skirt 30. Preferably the groove is located adjacent the end of the piston skirt, as shown. The coil spring 48, under compression between the ring 50 and abutment 46, urges the connecting rod 28 toward the piston to hold the bearing member 34 in engagement with both of the opposed sockets 32 and 38. By this arrangement and interconnection of the piston and its connecting rod, it will be seen that the spring acts to take up wear between the parts automatically, that assembly of the parts is facilitated by elimination of a wrist pin connection, and that a universal connection is attained which eliminates expensive precision operations formerly necessary to insure free action between a piston and its connecting rod.

In the modification of Figs. 5 to 7 inclusive, a piston 52 and a connecting rod 54 therefor are interconnected, as in the previous case, to eliminate slack between the parts irrespective of wear thereof and to eliminate expensive manufacturing and assembling operations. The piston 52 is hollow or has a skirt 56 which surrounds a rounded or spheroidal end portion 58 of the connecting rod 54. In the skirt 56, I provide an inner seat or annular shoulder 60 for a spheroidal seat or socket member 62 which receives the spheroidal end 58 of the connecting rod 54. The spheroidal socket member 62 is preferably made of a hard surface metal, such as hardened steel. To reinforce this socket member 62, I provide a backing plate 64 of relative thick metal, such as steel, which is interposed between the socket member 62 and the annular shoulder 60. As shown, the backing plate 64 is spheroidal in shape to conform or be complementary to the socket member and to the rounded end 58 of the connecting rod.

The socket member 62 and its backing plate 64 may be held in place against the annular shoulder 60 solely by the action of a coil or helical spring 66 which acts to urge the rounded end of the piston rod into and against the socket member 62. One end of the spring 66 abuts end portions of an abutment member 68 which extends from opposite ends of a transverse bore 70 provided in the spheroidal end 58 of the connecting rod. As shown, the abutment member 68 may be in the form of a pin having its opposite ends flattened to receive the adjacent end of the spring. The bore 70 is preferably located so that it is substantially coaxial with the spheroidal end of the connecting rod, as shown. The other or outer end of the spring 66 abuts a split ring 72 set in an annular recess adjacent the bottom edge of the skirt 56. It will be seen that this modification includes a universal connection and a continuous slack free condition due to the slack take up action of the spring 66. In addition, I have provided for decreasing wear between the parts by delivering lubricant to the engaging, relatively moving surfaces. To this end, I provide a lubricant passage or bore 74 extending longitudinally of and through the connecting rod 54, which intersects the transverse bore 70 of the spring abutment 68 and continues to intersect or open through the spheroidal end of the connecting rod into the engaging socket of the piston. From a suitable source of supply, lubricant may be delivered through passage 74 to lubricate the opposed surfaces of the abutment 68 and to lubricate the opposed engaging surfaces of the spheroidal rod end 58 and its piston socket member 62. To insure adequate supply of lubricant to the socket, I provide an annular groove 76 in the outer periphery of the abutment member 68 in open communication with the passage or bore 74.

From the foregoing description it will be noted that I have provided an improved interconnection between a piston and piston rod which eliminates slack and resultant inefficiency and noise due to wear of the parts. Also, it will be noted that I have provided a piston and piston rod connection of a character such that the parts may be readily assembled without need of making precise alignments therebetween. In this connection, I have effected a saving in manufacturing cost of the parts which because of the aforementioned universal connection between rod and piston, eliminates need for precision operations. Furthermore, I have provided, in a piston and rod connection having the above advantages, for the lubrication of certain bearing surfaces to decrease wear and improve free operation of the parts.

Although only a preferred form of the invention has been illustrated, and that form described in detail, it will be apparent to those skilled in the art that various modifications may be made therein without departing from the spirit of the invention or from the scope of the appended claims.

I claim:

1. In combination, a piston having a socket therein, a connecting rod, a bearing member carried by said connecting rod engaging in said socket, an elongated abutment member carried by and extending transversely through said connecting rod and a spring urging said piston and said abutment member together holding said bearing member in said socket.

2. In combination, a piston having a socket therein, a connecting rod, a rounded bearing member on said connecting rod engaging in said socket, a laterally extending elongated abutment member carried by and extending transversely through said connecting rod, and a coil spring surrounding said connecting rod having one end acting against said piston and the other end acting against said abutment member urging said bearing member into engagement with said socket.

3. In combination, a piston having a socket therein, a piston connecting rod having one end engaging in said socket, a transverse bore in said rod adjacent the said one end thereof, an abutment member in said bore extending laterally from said rod, spring means acting against said piston and against said abutment member urging said rod end into engagement with said socket, and a lubricant delivery passage extending in and longitudinally of said rod intersecting said bore and also intersecting the surface of said socket.

4. In combination, a piston having a spheroidal socket therein, a connecting rod having a spheroidal end engaging in said socket, said spheroidal end of said connecting rod having a transverse bore therethrough, an abutment member in said bore projecting from said spheroidal end of said connecting rod, a coil spring surrounding said connecting rod having one end engaging said piston and having the other end engaging said abutment member urging said spheroidal connecting rod end into engagement with said spheroidal socket, and a lubricant delivering passage extending longitudinally through said piston rod intersecting said bore and opening through the spheroidal end of said connecting rod into said socket.

5. In combination, a piston having a socket in one end surface thereof and having a skirt, a piston connecting rod having a bearing on one end thereof engaging in said socket, a transverse bore in said connecting rod intermediate the ends thereof, an abutment member in said bore extending laterally from said connecting rod, a coil spring surrounding said connecting rod having one end abutting said skirt and having the other end abutting said abutment member acting to hold said bearing in engagement with said socket, a lubricant passage extending in and longitudinally of said rod, said passage intersecting said bore and opening at the surface of said bearing in said socket, and a lubricant passage in said abutment member communicating with said first-named lubricant passage.

6. In combination, a piston having a socket and having a skirt, a connecting rod having a socket in one end thereof in opposed relationship to said piston socket, a bearing member interposed between and engaging in both of said sockets, a laterally extending abutment member forming a portion of said piston socket and a spring acting on said skirt and on said abutment member urging said piston and said connecting rod toward each other to maintain engagement of said sockets and said bearing member.

7. In combination, a piston having a spheroidal socket and having a skirt, a connecting rod having a spheroidal socket in one end thereof in opposed relationship to said first spheroidal socket, a ball interposed between and engaging in said sockets carried thereby, means retaining said ball in one of said sockets, and a coil spring acting on said skirt and on said connecting rod urging said piston and connecting rod toward each other to maintain contact between said sockets and said ball.

8. In combination, a piston having a socket and having a skirt, a connecting rod having a socket in opposed relationship to said first socket, a bearing member interposed between and engaging said sockets, a recess in said second socket extending transversely of said connecting rod, an abutment member in said recess projecting laterally of said connecting rod, and a coil spring acting on said skirt and on said abutment member urging said connecting rod and said piston toward each other to maintain engagement of said sockets and said bearing member.

9. In combination, a piston having a spheroidal socket and having a skirt, a connecting rod having a socket cup in opposed relationship to said first socket, a ball bearing interposed between and engaging in said sockets, said ball bearing having an annular groove in its outer periphery, an outer marginal edge portion of said socket cup engaging in said annular groove retaining said ball bearing to said connecting rod, and means holding said ball bearing in engagement with the socket in said piston.

10. In combination, a piston having a socket, a connecting rod having an end engaging in said socket, an opening extending transversely through said rod adjacent said one end thereof, an abutment member in said opening having end portions projecting from said rod, and a spring acting on said piston and on said abutment member urging said one end of said rod into contact with said socket.

11. In combination, a piston having a socket, a connecting rod having a socket on one end thereof opposed to said first socket, a transversely extending recess in said second socket, a spring surrounding said rod having one end acting against said piston, a rounded bearing member carried in said second socket and engaging in the first socket, and an elongated abutment member in said recess receiving the other end of said spring and partly forming said second socket.

RALPH W. DOEG.

REFERENCES CITED

The following references are of record in the file of this patent:

UNITED STATES PATENTS

| Number | Name | Date |
|---|---|---|
| 1,500,010 | Smith et al. | July 1, 1924 |
| 1,788,566 | Dock | Jan. 13, 1931 |
| 1,898,872 | Evanoff et al. | Feb. 21, 1933 |
| 1,996,826 | Ohmart | Apr. 9, 1935 |